3,442,671
COATING COMPOSITION AND PROCESS

Grey F. Rolland, Norristown, and John J. Seipel, Ambler, Pa., assignors to Benjamin Foster Company, Philadelphia, Pa., a corporation of Delaware
No Drawing. Filed Apr. 29, 1966, Ser. No. 546,173
Int. Cl. C09d 1/04
U.S. Cl. 106—84    11 Claims

ABSTRACT OF THE DISCLOSURE

A water resistant, incombustible inorganic coating composition for use as a protective coating for insulative surfaces, the composition containing a water soluble alkali metal silicate, mica, magnesium aluminum silicates, alkaline soluble salts of both an alkylenediaminepolyalkanoic acid and a hydroxyalkyl derivative thereof, water and, optionally, a filler and a polyalkanolamine.

---

The present invention relates to an inorganic coating composition and process and, more particularly, is concerned with the production of a water resistant and incombustible coating composition for use over thermal insulation applied to heating and air-conditioning ducts, piping, vessels and similar equipment.

The use of thermal insulation systems over heating, ventilating and refrigeration equipment is well established in the art. This practice provides effective barriers against heat transfer or loss of cooling capacity. Although a wide variety of insulation materials are available for such use, these materials only provide control to heat losses and require a protective finish against physical damage and water and water vapor penetration.

The use of protective coatings over insulation systems is also well established in the art. For example, such systems as organic coatings based on asphalts, synthetic resins, resin emulsions and elastomers have found extensive application for purposes of protecting underlying insulation. However, such systems, although formulated to be fire resistant, are not truly incombustible.

Due to the rigid requirements of substantial incombustibility and water resistance for certain applications, particularly for application in accordance with Code of Federal Regulations Title 46, 72.05–40 (U.S. Coast Guard Regulations, Subpart 164.012), hereinafter called "Coast Guard Regulations," [1] the vast majority of the currently existing insulation finishes cannot be utilized for such applications. An "incombustible" material is defined in 46 Code of Federal Regulations 164.009 (U.S. Coast Guard Regulations) as a material which shall pass the heated tube test for incombustibility as noted in § 164,009–3(d). It has been proposed in order to provide substantially incombustible surface finishes to utilize such systems as asbestos millboard and asbestos felt and paper, sheetmetal and metal foil, and cementitious materials, such as plaster. However, these incombustible materials proposed for protective finishes have certain inherent drawbacks in that they are not sufficiently puncture-resistant, may be too heavy in weight for the particular application desired, and may be prohibitively expensive and thus have limited commercial potential.

Accordingly, there exists a critical need for a protective coating system which is capable of meeting the rigid requirements of substantial incombustibility and water resistance while retaining such desirable properties as impact resistance, adhesion and abrasion resistance.

In accordance with the foregoing, the principal object of the present invention may be said to reside in the provision of a protective coating composition which provides substantial incombustibility and water resistance so as to meet the requirements of Coast Guard Regulations pertaining to the insulation and finishing of heating, refrigeration and air-conditioning ducts and equipment on ships.

A further object of the present invention is the provision of a process for the application of a substantially incombustible coating over insulation surfaces to provide an inorganic coating possessing water resistance, high adhesion and impact resistance.

The present invention is based upon the discovery that a coating composition consisting essentially of:

(a) a binder component
(b) a suspending agent
(c) a chelating agent
(d) mica; and
(e) water wherein said binder component comprises soluble alkali metal silicates wherein the alkali metal oxide to $SiO_2$ weight ratio is 1:1.8 to 3.75; wherein said suspending agent comprises a colloidal magnesium aluminum silicate; and wherein said chelating agent comprises an admixture of alkaline soluble salts of alkylenediaminepolyalkanoic acids and hydroxyalkyl substituted alkylenediaminepolyalkanoic acids, is capable of providing a substantially incombustible and water resistant coating over insulation surfaces.

The binder component comprises water soluble alkali metal silicates wherein the alkali metal oxide to $SiO_2$ weight ratio is 1:1.8 to 3.75. Typical examples of such alkali metal silicates include:

| Ratio, $M_2O:SiO_2$ | Percent $M_2O$ | Percent $SiO_2$ |
|---|---|---|
| 1:3.75 | 21 | 79 |
| 1:3.22 | 23.7 | 76.3 |
| 1:2.50 | 28.6 | 71.4 |
| 1:2.10 | 32.2 | 67.8 |
| 1:1.95 | 38.9 | 66.1 | wherein the M signifies an alkali metal, particularly sodium and potassium. The preferred alkali metal silicate is the potassium salt since this particular salt has been found to provide dry coatings demonstrating superior properties in our invention with respect to atmospheric exposure, particularly water resistance and non-effluorescence as compared, for example, with sodium silicate. These findings are surprising and unexpected in view of the fact that potassium silicate is known to be more water soluble than the corresponding sodium salt.[2]

---

[1] Copy of this Coast Guard Regulation is attached hereto and made a part hereof.

[2] In the book Soluble Silicates, by J. G. Vail, Reinhold Publishing Co., New York, 1952, it is stated (Vol. I, page 32), "The rate of fusion and the rate of solution of the potassium glass are much higher than those of the sodium glass having the same molecular ratio".

The amount of soluble alkali metal silicate, calculated as $M_2O:SiO_2$, which must be employed is critical, and should be from 10 to 36% by weight based on the coating composition. Where less than 10% is employed the resulting coating frequently cracks during drying and the dry coating will have very poor impact resistance, will be powdery and will possess essentially no water resistance. Conversely, where the amount of alkali metal silicate which is employed is greater than 36% by weight of the total composition, the resulting coating will be difficult to apply and will also result in cracking as the coating dries.

The essential mica component must be present in an amount of from 6 to 41% based upon the total weight of the coating composition. If less than 6% mica component is employed, the resulting composition will be difficult to apply, will exhibit cracking as the coating dries and will possess poor water resistance. Conversely, where the amount of mica component is greater than 41% by weight of the coating composition, the resulting coating will be subject to cracking during drying, so that the final coating will have very poor impact resistance, will be powdery and will exhibit very poor water resistance.

Although the particle size of the mica component is not critical, it should preferably be from about 5 to about 60 microns. A particularly preferred mica is one which has been subjected to a micronizing process utilizing high pressure, steam jets. This process delaminates the mica lamellae thus resulting in a more uniform mineral product having a particle size range of from about 5 to 20 microns. A commercial supply of this preferred mica is available under the name "Micro mica" from the English Mica Company, Stamford, Conn. The use of this preferred mica yields dry coatings having excellent water resistance without the necessity of resorting to curing by heat using baking cycles or to reactive chemical treatment. Heretofore, acceptable levels of water resistance capable of meeting established test methods could only be obtained on dry silicate coatings containing mica by resorting to one or more of these treatments as is evident from the teachings of U.S. Patents 2,084,486, 2,372,285, and 2,449,346.

Although not essential to satisfactory coatings, it has been found that a portion of the essential mica component may, if desired, be replaced by inert mineral filler components selected from the group consisting of titanium dioxide, calcium carbonate, silica and asbestos for the purposes of imparting color or viscosity changes. Where such mineral filler is employed, an amount of up to 35% by weight thereof, based upon the total weight of the coating composition, may be used in place of a like amount of the mica component.

With respect to the titanium dioxide and the calcium carbonate fillers, both of these components, where used, are preferably of a particle size not exceeding about 60 microns so as to insure obtaining a smooth coating.

The silica filler, where employed, should preferably meet a particle size limitation of up to about 110 microns for satisfactory operation of the coatings of this invention. A particularly preferred silica filler is one which is available in the trade under the name "silica flour," which is a silica sand ground to a particle size smaller than 110 microns.

The asbestos filler component, where employed, is preferably a short fiber asbestos product, generally of the Canadian chrysotile asbestos classification, grades 6 and 7. These particular asbestos classifications are graded in accordance with the Quebec standard testing machine. This machine separates and classifies into its component fiber lengths a one pound sample of asbestos fiber on ½ inch, 4 and 10 mesh screens and pan by shaking action. The screens are shaken exactly 600 times at a speed of 328 r.p.m. The weight, in ounces of fiber, retained on each screen and in the pan determines the grade. For example, grade 7D tests 0—0—7—9 (½ inch mesh screen—0 ounces; 4 mesh screen—0 ounces; 10 mesh screen—7 ounces; pan—9 ounces). The use of the asbestos filler component, where employed, has been found to be particularly desirable in formulations which are to be applied by trowel application. Such asbestos fiber component imparts desirable thickening properties which are particularly desirable for trowel application.

The essential suspending agents which must be employed in the inorganic coating compositions of this invention are colloidal magnesium aluminum silicates having certain narrow composition limits of silicon dioxide, magnesium oxide and aluminum oxide in accordance with the following:

|  | Percent |
|---|---|
| Silicon dioxide | 60–63 |
| Magnesium oxide | 12.5–15 |
| Aluminum oxide | 8.5–10 |

The balance of the suspending agent compositions comprises alkali and alkaline earth metal oxides and water. Moreover, these particular magnesium aluminum silicates must display a viscosity of from 190 to 310 cps., for a 5% solution or colloidal suspension thereof, as determined at 25° C. using a Brookfield viscometer at 25° C.

A commercial formulation falling within these specifications is available from the R. T. Vanderbilt Company under the trade name Veegum thickener. The analysis of this particular colloidal magnesium aluminum silicate product is reputed to be as follows:

| | |
|---|---|
| Silicon dioxide _____percent__ | 61.1 |
| Magnesium oxide _____do____ | 13.7 |
| Aluminum oxide _____do____ | 9.3 |
| Alkali and alkaline earth metal oxides _____do____ | 8.7 |
| Water of combination _____do____ | 7.2 |
| Specific gravity @ 25° C. _____ | 2.5 |
| Viscosity @ 25° C. (Brookfield), 5% solution cps__ | 250 |

The essential suspending agents must be present in amounts ranging from 0.25 to 4.0% by weight based on the total weight of the coating composition. If less than 0.25% by weight of these agents are utilized, the stability of the coating compositions, prior to application, will be inferior due to flocculation and precipitation of the coating constituents from the aqueous medium. Conversely, where an amount greater than 4.0% by weight of the suspending agents are employed, the coating composition will be very viscous and difficult to apply, especially from conventional spray apparatus.

In utilizing the essential suspending agents of this invention it has been discovered that the technique employed in incorporating such agents into the aqueous coating compositions of this invention is critical. For example, when such agents are simply added to aqueous solutions of dissolved alkali metal silicate binder components, they will not provide the required suspendability necessary to maintain stability of the ultimate formulation.

In order to insure obtaining the required suspending properties, it has been found necessary to prepare an aqueous dispersion of the suspending agents before incorporating such agents into the compositions of this invention. This is accomplished by admixing from 9 to 99 parts of water with each part of magnesium aluminum silicate and permitting such silicate components to expand to form a colloidal dispersion which is then suitable for use in this invention.

As indicated hereinabove, it is essential that a chelating agent also be included in the coating compositions of this invention. The particular agents which have been found to be suitable for use in this respect are admixtures of alkaline soluble salts of alkylenediaminepolyalkanoic acids, such as for example the ethylene and propylenediamine di, tri and tetraacetic acids with hydroxyalkyl substituted alkylenediaminepolyalkanoic acids, such as hydroxyethyl-ethylenediaminetriacetic acid. The relative amounts of these respective chelating agents has been found to be important and should be such that from about 2 to 3 parts of alkylenediaminepolyalkanoic acid compounds are used for each part of hydroxyalkyl substituted alkylenediaminepolyalkanoic acid compound. This ratio of components has been found to yield completely acceptable results over the entire range of usage of the other essential components.

Surprisingly, it has been found that when either the alkylenediaminepolyalkanoic acid compounds or the hydroxyalkyl substituted alkylenediaminepolyalkanoic acid compounds are used alone, such compounds do not provide the required level of chelation, so that stable coating compositions cannot be obtained. It is only where these essential chelating agents are employed, in the ratio hereinabove set forth, that completely stable coating compositions can be realized.

Surprisingly, it has also been found that improved composition stability, particularly where one or more filler components are utilized, can be obtained if from 3 to 8 parts of a polyalkanolamine compound is incorporated into the chelating agent admixture for each 100 parts of total chelating agent components. Typical examples of polyalkanolamine compounds which are suitable for use in this respect are the di- and triethanol and propanolamines.

The total level of combined chelating agents must be present in amounts ranging from 0.05 to 1% by weight, based upon the total weight of the coating composition. Where less than 0.05% of combined chelating agents is used, various polyvalent metal ions which are present in the compositions of this invention, particularly in the compositions containing one or more filler components, will not properly be chelated in the coating composition and will cause precipitation or flocculation of essential coating components, thereby impairing the age stability of the coating composition.

Conversely, where the amount of chelating agent used is greater than 1.0% by weight, based upon the weight of the coating composition, it has been found that no substantial improvement in composition stability is obtained, and that the required level of incombustibility of the coating may be impaired. Accordingly, in order to assure obtaining a substantially incombustible coating, consistent with the requirements of Coast Guard Regulations, it is preferred to use no more than about 1.0% of combined chelating agents.

The final essential component is water. This must be present in an amount of at least 16% by weight based upon the weight of the coating composition. If less than 16% water is used, the composition will be too viscous for application, even for trowel application.

Larger amounts of water may be employed if desired, up to a maximum of 83.7% by weight of the composition. However, use of water in amounts greater than 60% by weight of the composition is not desirable for the reason that the essential coating constituents will then be present at levels which are too low to provide sufficiently serviceable coatings after drying.

The entire water content is most advantageously added at separate levels in association with different essential coating components. For example, the essential soluble alkali metal silicate binder is preferably dissolved in a portion of the water, and an aqueous formulation of the colloidal magnesium silicate suspending agent is then added, with stirring, to obtain a homogenous composition. To this admixture is then added the mica component, plus any other filler components, if desired, with the chelating agent being added for stability.

In order to illustrate the surprising properties of compositions falling within the scope of this invention, as compared with prior art silicate coatings, there is presented below, in Table I, a comparison of the water resistant properties of dry applications produced from the formulations of this invention. The water resistance was determined in accordance with Federal Test Method Standard No. 141, Method 6162, as amended, utilizing a coating applied with a film applicator of 0.05 inch clearance and dried for 10 days at 73±5° F. and 50±2% relative humidity. The water resistance, as determined by the number of brush strokes withstood by the coatings, is recorded in the table.

TABLE I

| Ingredients, percent by wt. | Examples | | | | | |
|---|---|---|---|---|---|---|
| | 1 | 2 | 3 | 4 | 5 | 6 |
| Potassium silicate | 36 | 36 | 32 | 12 | | |
| Sodium silicate | | | 4 | 12 | 36 | 36 |
| Mica [1] | 10 | | 10 | 18 | 10 | |
| Calcium carbonate | | 1 | | | | 1 |
| Titanium dioxide | | 4 | | 5 | | 4 |
| Silica | | 2 | | | | 2 |
| Asbestos [2] | | 3 | | 1 | | 3 |
| Suspending agents [3] | 0.75 | 0.75 | 0.75 | 1 | 0.75 | 0.75 |
| Chelating agents [4] | 0.25 | 0.25 | 0.25 | 0.4 | 0.25 | 0.25 |
| Water | 53 | 53 | 53 | 50.6 | 53 | 53 |
| Ratio $M_2O:SiO_2$ | 1:2.1 | 1:2.1 | 1:2.1 | 1:2.5 | 1:3.2 | 1:3.2 |
| Water resistance (strokes) | >1,000 | 152 | >1,000 | 823 | 718 | 177 |

[1] "Micro mica."
[2] Canadian Chrysotile Asbestos Grade 7D.
[3] The suspending agents consisted of a 5% aqueous solution of magnesium aluminum silicate having the following dry weight analysis: silicon dioxide, 61%; magnesium oxide, 13%; aluminum oxide, 9.2% balance alkali and alkaline earth metal oxides and water of combination; specific gravity at 25° C. 2.5; viscosity at 25° C. (Brookfield) 5% solution, 240 cps.
[4] The chelating agents were added as a 60% aqueous solution. Dry weight analysis 65% ethylenediaminetetraacetic acid; 30% hydroxyethyl-ethylenediaminetriacetic acid; 5% triethanolamine.

The compositions of Examples 1 to 6 inclusive were prepared by dissolving the silicate component in a portion of the water requirement. To this solution was then added the 5% aqueous solution of the suspending agents. Thereafter, the mica and/or the other mineral filler components, where employed, were added with stirring, at room temperature, to yield uniform compositions to which were then added the respective amounts of chelating agents and the balance of the water to complete the formulations.

From the results of the water resistance tests it is readily apparent that the utilization of mica in conjunction with sodium and/or potassium silicate yielded formulations producing excellent water resistance properties which were not obtainable without the use of mica. It is also apparent from the results of Examples 1 through 6 inclusive, that optimum results were obtained utilizing potassium silicate as the sole silicate binder component.

Additional examples of formulations are presented below to illustrate further embodiments of this invention, but which are not to be construed as in any way limiting the invention except as defined in the appended claims.

Example 7

| Ingredient: | Percent by wt. |
|---|---|
| Potassium silicate | 20 |
| Mica | 26 |
| Suspending agents [1] | 2 |
| Chelating agents [2] | 0.2 |
| Water | 51.8 |

$M_2O:SiO_2$ weight ratio=1:2.1.

[1] The suspending agents were employed as a 10% aqueous solution, having a dry weight analysis of 60% silicon dioxide; 12.5% magnesium oxide; 8.5% aluminum oxide; with the balance comprising alkali and alkaline earth metal oxides and combined water.
[2] The chelating agents were added as a 60% aqueous solution, having a dry weight analysis of 65% ethylenediaminetetraacetic acid and 35% hydroxyethyl-ethylenediaminetriacetic acid.

The composition of Example 7 was prepared by adding the potassium silicate to approximately one-half of the water requirement. To this solution was then added the magnesium aluminum silicate as a 10% aqueous colloidal suspension. Thereafter, the mica was added with stirring to yield a uniform composition to which the chelating agents and the balance of the water were then added.

Example 8

| Ingredient: | Percent by wt. |
|---|---|
| Potassium silicate | 10 |
| Mica | 27 |
| Silica | 7 |
| Titanium dioxide | 6.2 |
| Suspending agents [1] | 01 |
| Chelating agents [2] | 49.7 |

$M_2O:SiO_2$ weight ratio=1:2.5.

[1] The suspending agents were employed as a 10% aqueous solution, having a dry weight analysis of 62% silicon dioxide; 14% magnesium oxide; 8.5% aluminum oxide. A 5% solution of the suspending agents displayed a Brookfield viscosity, at 25° C., of 270 cps.
[2] The chelating agents were added as a 60% aqueous solution, having a dry weight analysis of 70% ethylenediaminetetraacetic acid; 25% hydroxyethyl-ethylenediaminetriacetic acid and 5% triethanolamine.

Example 9

| Ingredient: | Percent by wt. |
|---|---|
| Potassium silicate | 22.4 |
| Sodium silicate | 4.0 |
| Silica | 12.4 |
| Mica | 15.7 |
| 7R Asbestos | 2.6 |
| Titanium dioxide | 1.2 |
| Suspending agents [1] | 1.0 |
| Chelating agents [2] | 0.1 |
| Water | 40.6 |

$M_2O:SiO_2$ weight ratio=1:2.05.

[1] The suspending agents were employed as a 10% aqueous solution, having a dry weight analysis of 63% silicon dioxide; 15% magnesium oxide; and 10% aluminum oxide, the balance of the composition comprising alkali and alkaline earth metal oxides and combined water. A 5% solution or suspension yielded a Brookfield viscosity, at 25° C., of 300 cps.
[2] The chelating agents were added as a 60% aqueous solution, having a dry weight analysis of 70% ethylenediaminetetraacetic acid; and 30% hydroxyethyl-ethylenediaminetriacetic acid.

Example 10

| Ingredient: | Percent by wt. |
|---|---|
| Sodium silicate | 30 |
| Mica | 20 |
| Calcium carbonate | 10 |
| Silica | 5 |
| Suspending agents [1] | 0.8 |
| Chelating agents [2] | 0.2 |
| Water | 34 |

$M_2O:SiO_2$ weight ratio=1:1.95.

[1] The suspending agents were employed as a 5% aqueous solution having a dry weight analysis of 61.1% silicon dioxide; 13.7% magnesium oxide; 9.3% aluminum oxide, with the balance of the composition comprising alkali and alkaline earth metal oxides and combined water. The 5% aqueous solution had a specific gravity of 2.5 at 25° C. and a Brookfield viscosity of 250 cps.
[2] The chelating agents were added as a 60% aqueous solution, having a dry weight analysis of 64% ethylenediaminetetraacetic acid; 28% hydroxyethyl-ethylenediaminetriacetic acid and 8% triethanolamine.

Example 11

| Ingredient: | Percent by wt. |
|---|---|
| Sodium silicate | 22.4 |
| Mica [1] | 12 |
| Asbestos [2] | 5 |
| Silica | 3 |
| Titanium dioxide | 1.6 |
| Calcium carbonate | 5 |
| Suspending agents [3] | 1.5 |
| Chelating agents [4] | 0.5 |
| Water | 49 |

$M_2O:SiO_2$ weight ratio 1:3.22.

[1] "Micro mica."
[2] Canadian chrysotile asbestos Grade 5.
[3] The suspending agents were employed as a 5% aqueous solution having a dry weight analysis of 61.1% silicon dioxide; 13.7% magnesium oxide; 9.3% aluminum oxide, with the balance of the composition comprising alkali and alkaline earth metal oxides and combined water. The 5% aqueous solution had a specific gravity of 2.5 at 25° C. and a Brookfield viscosity of 250 cps.
[4] The chelating agents were added as a 60% aqueous solution, having a dry weight analysis of 64% ethylenediaminetetraacetic acid; 23% hydroxyethyl-ethylenediaminetriacetic acid and 3% triethanolamine.

Examples 8 to 11 inclusive were all prepared in accordance with the procedure described following Table I, above. Dried coatings produced from these compositions were all found to provide excellent water resistance as determined in accordance with Federal Test Method Standard No. 141a, as identified above, and were also found to be substantially incombustible as determined by the requirements of Coast Guard Regulations, as above described.

We claim:
1. An inorganic coating composition consisting essentially of:
 (a) a binder component;
 (b) a suspending agent;
 (c) a chelating agent;
 (d) mica; and
 (e) water,
  wherein said binder component is a water soluble, alkali metal silicate, wherein the alkali metal oxide to $SiO_2$ ratio is from 1:1.8 to 3.75 and wherein said silicate is present in an amount of from 10 to 36% by weight of the coating composition;
  wherein said suspending agent is magnesium aluminum silicate having from 60–63% by weight silicon dioxide, 12.5–15% by weight magnesium oxide, 8.5–10% by weight of aluminum oxide, and having a Brookfield viscosity of 190–310 cps. at 25° C. for a 5% aqueous solution, said silicate being present in an amount of from 0.25 to 4.0% by weight of the coating composition;
  wherein said chelating agent is a mixture of alkaline soluble salts of at least one each of an alkylenediaminepolyalkanoic acid and a hydroxyalkyl alkylenediaminepolyalkanoic acid, said mixture containing from about 2 to 3 parts of said alkylenediaminepolyalkanoic acid to one part of said hydroxyalkyl alkylenediaminepolyalkanoic acid, and said mixture being present in an amount of from 0.05 to 1.0% by weight of the coating composition; wherein said mica is present in an amount of from 6 to 41% by weight of the coating composition; and wherein said water is present in an amount of from 16 to 83.7% by weight of the coating composition.

2. An inorganic coating composition according to claim 1 wherein said alkali metal silicate is potassium silicate.

3. An inorganic coating composition according to claim 1 wherein the particle size of said mica is within the range of from about 5 to about 60 microns.

4. An inorganic coating composition according to claim 1 wherein said mica is delaminated mica which has a particle size within the range of from about 5 to 20 microns.

5. An inorganic coating composition according to claim 1 wherein up to 35% of the mica component is replaced with a filler component selected from the group consisting of silica, calcium carbonate, titanium dioxide and asbestos.

6. An inorganic coating composition according to claim 5 wherein the asbestos filler component is Canadian chrysotile asbestos of grade 6 or 7.

7. An inorganic coating composition according to claim 5 wherein the chelating agent also includes from 3 to 8 parts of a polyalkanolamine for each 100 parts of total chelating agent compounds.

8. An inorganic coating composition according to claim 1 wherein the chelating agent also includes from 3 to 8 parts of a polyalkanolamine for each 100 parts of total chelating agent compounds.

9. An inorganic coating composition according to claim 7 wherein the polyalkanolamine is triethanolamine.

10. An inorganic coating composition according to claim 1 wherein the water is present in an amount of from 16 to 60% by weight of the coating composition.

11. An inorganic coating composition according to claim 8 wherein the polyalkanolamine is triethanolamine.

References Cited

UNITED STATES PATENTS

| | | | |
|---|---|---|---|
| 2,261,260 | 11/1941 | Kraus | 106—84 |
| 3,009,829 | 11/1961 | Gouveia | 106—74 |
| 3,102,038 | 8/1963 | Fisher | 106—84 |
| 3,207,624 | 9/1965 | Burrage et al. | 106—84 |

JAMES E. POER, *Primary Examiner.*